United States Patent [19]

Ogino

[11] Patent Number: 4,931,703
[45] Date of Patent: Jun. 5, 1990

[54] S-DISTORTION CORRECTING CIRCUIT FOR CRT

[75] Inventor: Masanori Ogino, Yokohama, Japan

[73] Assignee: Hitachi, Ltd., Tokyo, Japan

[21] Appl. No.: 393,959

[22] Filed: Aug. 15, 1990

[30] Foreign Application Priority Data

Aug. 26, 1988 [JP] Japan ................................ 63-210702

[51] Int. Cl.$^5$ ........................ H01J 29/56; H01J 29/70
[52] U.S. Cl. .................................... 315/370; 315/389
[58] Field of Search ........................ 315/370, 371, 389

[56] References Cited

U.S. PATENT DOCUMENTS 4,795,946 1/1989 Nishiyama .......................... 315/370

Primary Examiner—Thomas H. Tarcza
Assistant Examiner—Gregory C. Issing
Attorney, Agent, or Firm—Antonelli, Terry, Stout & Kraus

[57] ABSTRACT

For a multi-scan display having a single S-capacitor incorporated, a S-distortion correcting circuit capable of correcting S distortion at any horizontal scanning frequency. The S-distortion correcting circuit comprises a first circuitry for cancelling out horizontal S-distortion making appearance in dependence on geometrical relation between scanning locus of an electron beam and the plane of screen of a picture tube, a second circuitry for cancelling out horizontal S-distortion generated in a horizontal scanning circuit in inverse proportion to the second power of the horizontal scanning frequency and an auxiliary deflection coil. The outputs of the first and second circuitries are added together. A current supplied to the auxiliary deflection coil is so controlled that a signal representing the result of the addition substantially coincides with a feedback signal from the auxiliary deflection coil. Thus, the first circuitry makes available the S-distortion correcting quantity independent of the horizontal scanning frequency, while the second circuitry cancels out a correction quantity of the S-capacitor which is proportional to the second power of the horizontal scanning frequency, whereby the correction of the S-distortion by the S capacitor is essentially cancelled out with only the correction by the first circuitry being rendered effective. The S-distortion correction is made possible independent of the horizontal scanning frequency.

7 Claims, 3 Drawing Sheets

S-DISTORTION CORRECTING CIRCUIT FOR CRT

BACKGROUND OF THE INVENTION

The present invention relates to a horizontal S-distortion correcting circuit suited profitably for use in a multi-scanning display device.

In a conventional high-definition CRT (cathode ray tube) display device, there is used a deflecting yoke of a uniform field type which scarcely brings about defocus in deflection (distortion of picture a displayed). In that case, geometrical relation between the scanning locus of an electron beam and the plane of a screen of the picture tube is such that the sine value of deflection angle is in proportion to a deflecting current while deflection distance on the screen is proportional to the tangent of the deflection angle. Consequently, when the deflecting current is of a saw tooth wave suffering no distortion, there rather makes appearance such geometrical distortion on the display screen that a peripheral portion of a picture is excessively deflected or distorted in the peripheral direction in proportion to the third power of the deflection angle. The geometrical distortion mentioned above is generally classified into a so-called pincushion distortion and S distortion (spiral distortion) which are compensated, respectively, by various appropriate means known in the art.

The present invention is concerned with correction of the horizontal S distortion among others.

The multi-scan display device is capable of handling a plurality of different horizontal frequencies. By way of example, three different horizontal scanning frequencies of 16 KHz, 32 KHz and 64 KHz can selectively be used in one and the same display device.

As a known means for compensating for the S distortion, there can be mentioned a S capacitor (i.e. S-distortion correcting capacitor) connected in cascade to a horizontal deflection coil. However, the S capacitor can not satisfactorily correct the S distortion except for that making appearance at a particular horizontal scanning frequency, because the S capacitor is of a fixed capacitance value. More specifically, the quantity for the correction increases in proportion to the second power of the horizontal scanning frequency $f_H$. Accordingly, when capacitance of the S capacitor is so selected that the correction quantity of a proper value can be obtained at the center value of the horizontal scanning frequency, then the correction quantity as selected naturally becomes insufficient at lower horizontal scanning frequencies while excessive correction will become effective in a higher range of the horizontal scanning frequencies. In this manner, in the multiscan display device, only the single S-distortion correcting capacitor is ineffective for correcting to any satisfactory extent the S distortion over all the horizontal scanning frequencies.

Under the circumstances, in the multi-scan display device, there are provided a plurality of S capacitors having different capacitances in correspondence to a variety of horizontal scanning frequencies, respectively, wherein S capacitance is changed over from one to another value correspondingly upon every change of the horizontal scanning frequency.

Needless to say, incorporation of the plural S capacitors in the horizontal deflecting circuit involves increase in the expenditure and the scale as well as complication of the circuit and exerts adverse influence to the reliability in operation of the circuit as well. Thus, it is desirable to be capable of correcting the S distortion completely over the whole range of the horizontal scanning frequencies by using only a single capacitor of a fixed capacitance value.

SUMMARY OF THE INVENTION

It is therefore an object of the present invention to provide a S-distortion correcting circuit for a multi-scan display device which allows the S distortion to be compensated for at any horizontal scanning frequency with a single S capacitor.

In view of the above object, there is provided according to an aspect of the present invention a S-distortion correcting circuit which comprises a first circuitry for cancelling out horizontal S distortion generated in dependence on geometrical relation between the scanning locus of an electron beam of a picture tube and the plane of a screen thereof, a second circuitry for canceling out horizontal S distortion which is in inverse proportion to the second power of a horizontal scanning frequency generated in a horizontal deflection circuit, and an auxiliary deflection coil, the outputs of the first and second circuitries being added together, wherein the current supplied to the auxiliary deflection coil is controlled in such sense that the signal representative of the result of the above-mentioned addition substantially coincides with a feedback signal from the auxiliary coil. More specifically, the first circuitry makes available a S-distortion correcting quantity independent of the horizontal scanning frequency, while the second circuitry cancels the correcting quantity of the S-capacitor which is in inverse proportion of the second power of the horizontal scanning frequency. Accordingly, the S-distortion correction by the S capacitor is essentially canceled to make only the correction by the first circuitry be effective, whereby correction of the S distortion is rendered possible independent of the horizontal scanning frequency.

DESCRIPTION OF THE PREFERRED EMBODIMENTS

Figure 1:
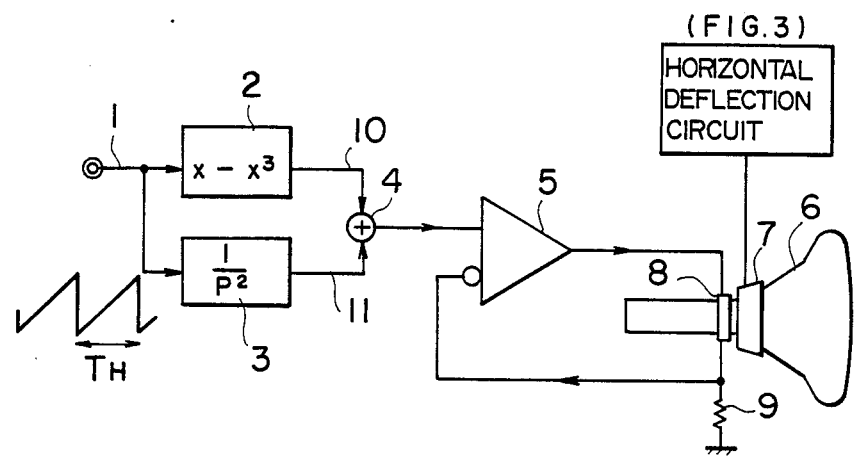
FIG. 1 is a circuit diagram showing a general arrangement of a S distortion correcting circuit according to an exemplary embodiment of the present invention.
Figure 2:
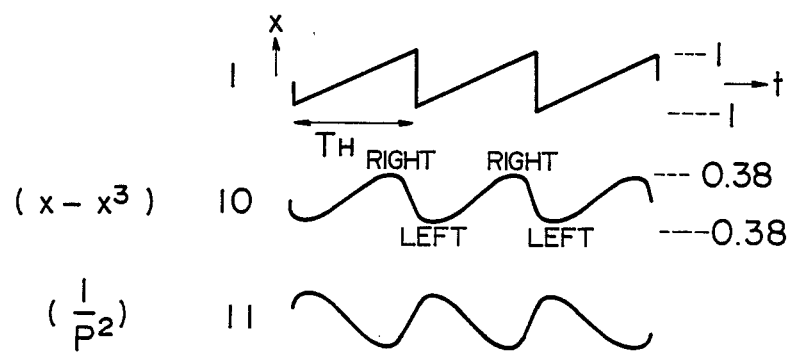
FIG. 2 is a waveform diagram showing waveforms of signals generated at circuit points in the S-distortion correcting circuit shown in FIG. 1.

FIG. 1 shows a S-distortion correcting circuit according to a first exemplary embodiment of the present invention. In the figure, a reference numeral 1 designates a saw tooth wave signal having a horizontal scanning frequency $T_H$ which can be derived, for example, by integrating a flyback pulse signal generated by a horizontal deflection circuit, as is well known in the art. A reference numeral 2 denotes a computing circuit for determining $(x-x^3)$, which circuit 2 is composed of a circuitry adapted for outputting a signal x proportional to the input saw tooth wave signal 1, a circuitry for outputting a signal representing the third power of the signal x, and a subtraction circuit for subtracting the third power output $x^3$ from the proportional output x. A numeral 3 denotes a double integrating circuit which is constituted by a cascade connection of first order lowpass filters each having a time constant sufficiently greater than the horizontal scanning period. A numeral 4 denotes an adder circuit, 5 denotes a negative feedback amplifier, 6 denotes a picture tube (CRT), 7 denotes a main deflection coil, 8 denotes an auxiliary deflection coil, and a numeral 9 denotes a resistor for detecting a voltage representative of a current flowing through the auxiliary deflecting coil 8. The detected voltage is fed back to the negative feedback amplifier 5 which performs negative feedback operation in such a manner that the detected voltage has a waveform substantially equal to the output waveform of the adder 4. FIG. 2 shows waveforms of signals making appearance at circuit points 1, 10 and 11 in the circuit shown in FIG. 1. Referring to FIG. 2, the waveform 1 represents the saw tooth wave signal mentioned above. It will be understood that the width of a raster generated on the screen of the picture tube is substantially in proportion to the amplitude of the saw tooth waveform signal. In the following description of the instant embodiment, it is assumed that the amplitude of the saw tooth waveform signal corresponding to a standard screen width assumes a value x ($-1 \leq x \leq 1$) standardized in $\pm 1$ unities. More specifically, the amplitude values of the saw tooth wave corresponding, respectively, to right and left half widths of the screen from the vertical center line thereof are represented each by one unity.

In FIG. 2, the output of the computing circuit 2 for determining $(x-x^3)$ hereinafter also referred to as the $(x-x^3)$ computing circuit or simply as the computing circuit is illustrated at 10. The output amplitude of the computing circuit 2 is so established as to be comparable to magnitude of the distortion generated due to geometrical relation between the scanning locus of the electron beam and the plane of the display screen, as will be described in more detail later on. Accordingly, the output amplitude of the computing circuit 2 is independent of the horizontal scanning frequency.

Shown in FIG. 2 at 11 is the output signal of the double integrating circuit 3 which is so arranged that changes due to a S capacitor having a fixed capacitance value is canceled out. Since both of the output characteristic of the double-integrating circuit 3 and the correction characteristic of the S capacitor exhibit a differential linearity characteristic which is in inverse proportion to the second power of the horizontal scanning frequency $f_H$, it is possible to cancel out the change in the linearity independent of the frequency.

Next, distortion of linearity ascribable to the physics of the scanning electron beam under deflection will be described quantitatively, while elucidating the relation between the correction quantity required for the $(x-x^3)$ computing circuit 2 and the deflection angle $\theta$ of the electron beam.

As is well known in the art, there exists between a current I flowing through the horizontal deflection coil and the horizontal deflection angle $\theta$ the following relation:

$$\sin \theta = KI \quad (1)$$

where K represents a proportional constant.

On the other hand, when the fluorescent screen is approximated by a plane, there exists between a relative deflection distance x on the screen equivalent to the standardized amplitude of the saw tooth wave) and the deflection angle $\theta$ the following relation:

$$x = \frac{\tan \theta}{\tan \theta_1} \quad (2)$$

where $\theta_1$ represents a deflection angle (in rad.) corresponding to one half screen width, while x may be regarded to be equal to the standardized amplitude of the saw tooth wave mentioned hereinbefore.

By developing the expression (2) in terms of $\sin \theta$, the following expression can be obtained.

$$x \tan \theta_1 = \frac{S}{\sqrt{1-S^2}} \approx S\left(1 + \frac{S^2}{2}\right) \quad (3)$$

where $S \equiv \sin \theta = KI$.

On the other hand, by expanding $\sin \theta$ in terms of $\tan \theta$, the following expression can be derived.

$$KI = \sin\theta \approx x \tan\theta_1 \left(1 - \frac{x^2 \tan^2 \theta_1}{2}\right) \quad (4)$$

The expression (3) means that the distortion of deflection exhibits a superlinearity (relation given by a function of $y = f(x^{1 \sim \infty})$), representing a peripheral expansion effect. On the other hand, the expression (4) shows that the correction quantity required for generating the raster suffering no distortion must have a sublinearity (relation given by a function of $y = f(x^{0 \sim 1})$), implying that the periphery must be contracted.

In order to derive such correcting waveform that the left and right sides of the picture interconnect each other continuously (i.e. the correcting waveform which assumes a same amplitude value at $x=1, -1$), the expression (4) is modified (in consideration of the fact that the waveform shown at 1 in FIG. 2 requires high frequency components) as follows:

$$KI = \sin\theta \approx x \tan\theta_1 \left(1 - \frac{\tan^2 \theta_1}{2}\right) + \frac{\tan^3 \theta_1}{2}(x - x^3) \quad (5)$$

In the above expression (5), the first term of the right side represents a linear deflection component of the saw tooth wave as generated by the main deflection coil, while the second term represents the correction quantity required in driving the auxiliary deflection coil by the $(x-x^3)$ computing circuit 2. Accordingly, a required relative correction quantity $\Delta$ expressed as standardized by the maximum amplitude of the main deflection component is given by $$\Delta = \frac{\frac{\tan^2 \theta_1}{2}(x - x^3)}{1 - \frac{\tan^2 \theta_1}{2}} \approx \frac{\tan^2 \theta_1}{2}(x - x^3) \quad (6)$$

Assuming, by way of example, that the deflection angle $\theta_1$ corresponding to the half screen width is equal to 30°, $$\Delta = 0.2 \, (x - x^3) \quad (7)$$

The maximum value and the minimum value of $(x - x^3)$ within the interval $[-1, 1]$ are determined to be $\pm 2\sqrt{3}/3 \approx \pm 0.38$ at $x = \pm 1\sqrt{3}$, respectively. In that case, the maximum and minimum values of $\Delta$ given by the expression (7) are $\pm 0.0076$, respectively. It can thus be understood that the correction can be realized by the auxiliary deflection corresponding to 7.6% of the main or primary deflection. In case $(-x^3)$ computing circuit is used in place of the $(x - x^3)$ computing circuit 2, the correction of as large an amount as 20% of the main deflection quantity will be necessary because of inclusion of high frequency components. In contrast, with the $(x - x^3)$ computing circuit, the amount of correction can be decreased by a factor of 0.38 when compared with the system in which the $(-x^3)$ computing circuit is assumed to be employed. In this way, an inexpensive S-distortion correcting circuit of low power consumption can be realized.

Having now described the amplitude required for the $(x - x^3)$ computing circuit 2, let's turn the description to the double-integrating circuit 3.

Figure 3:
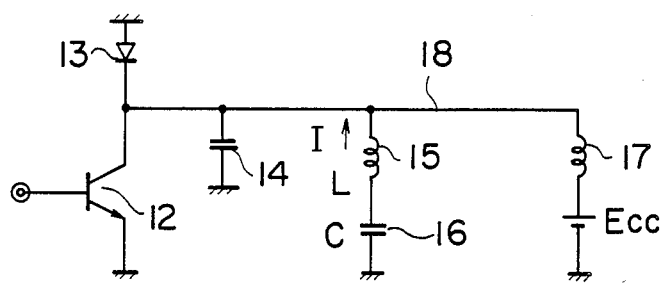
FIG. 3 is a circuit diagram showing a horizontal deflection circuit known heretofore.

FIG. 3 shows a circuit configuration of the conventional horizontal deflection circuit. In this figure, a reference numeral 12 denotes a horizontal output transistor, 13 denotes a damper diode, 14 denotes a resonant capacitor and a numeral 15 denotes a horizontal deflection coil constituting a part of the main deflection coil 7 shown in FIG. 1. Further, a reference numeral 16 denotes a so-called S-capacitor serving as a bypass capacitor, 17 denotes a choke coil constituting a part of power supply, and a numeral 18 denotes an output node at which a so-called flyback pulse signal is generated. A deflecting current having an amplitude represented by $I_{op}$ flows through the horizontal deflection coil 15. Representing the capacitance value of the S-capacitor 16 by C, the inductance of the horizontal deflection coil 15 by L and the current flowing during a scanning period by I, there is obtained the following expression (8) which is an approximate expression applying valid on the practical condition that the width of the flyback pulse is sufficiently small when compared with the horizontal scanning period $T_H$.

$$\frac{I}{I_{op}} \approx \frac{t}{T_1} + \frac{T_1^2}{6LC} \left( \frac{t}{T_1} - \frac{t^3}{T_1^3} \right) \quad (8)$$

where $T_1 \equiv T_H/2 = \frac{1}{2}f_H$ (horizontal half-period),
t: time where $|t| < T_1$, and
$t = 0$: corresponding to the center of the screen.

The first term of the right side of the above expression (8) represents a linear saw tooth waveform current, the second term represents a non-linear component due to the S capacitor of fixed value incorporated in the horizontal deflecting circuit and corresponds to the waveform 11 shown in FIG. 2. The amplitude coefficient $T_1^2/6LC$ of the nonlinear component is proportional to $T_1^2$ and thus in inverse proportion to the second power of the horizontal scanning frequency $f_H$. Accordingly, by making the output amplitude of the double integrating circuit 3 of the arrangement shown in FIG. 1 correspond complementarily to the abovementioned amplitude coefficient, correction performed by the S-capacitor can be canceled out.

In the multi-scan display device to which the present invention is applied, the abovementioned coefficient is made to conform substantially with the coefficient given by the expression (6) at the particular horizontal scanning frequency ($f_{HO}$) within the applicable range. In other words, $$\frac{1}{24LCf_{HO}^2} \approx \frac{\tan^2 \theta_1}{2} \therefore C \approx \frac{1}{12L f_{HO}^2 \tan^2 \theta_1} \quad (9)$$

Figure 4:
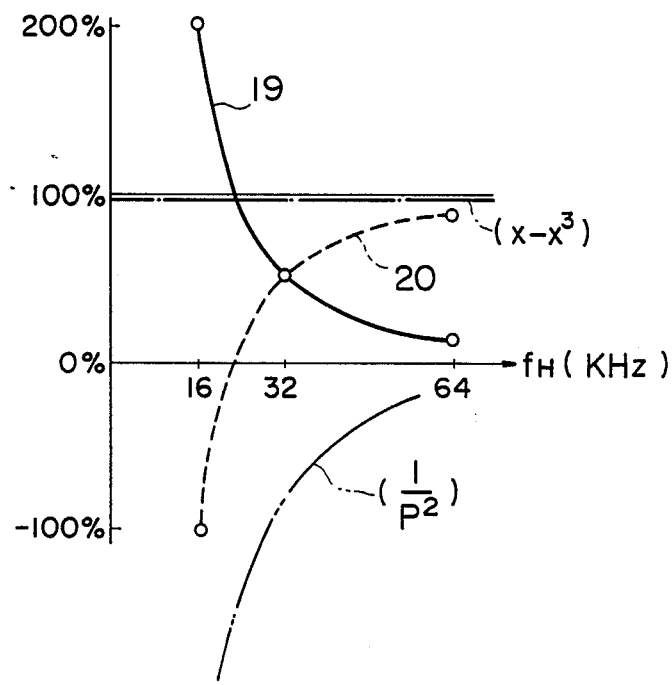
FIG. 4 is a view for graphically illustrating the effects achieved by the present invention.

In this way, S distortion can be compensated for due to the action of the S-capacitor at the particular frequency mentioned above. Correspondingly, the output of the adder 4 shown in FIG. 1 becomes zero. In the frequency range outside of the particular frequency mentioned above, difference makes appearance in the output of the adder 4, whereby the correction of S distortion can be complementarily accomplished, as is illustrated in FIG. 4 in which the horizontal scanning frequency $f_H$ is taken along the abscissa with the S-distortion correcting quantity being taken along the ordinate, wherein a line representing 100% of S-distortion correcting quantity corresponds to the proper or appropriate correction quantity given by the expression (5). In FIG. 4, a solid-line curve represents the action of the S-capacitor shown in FIG. 3, while a broken line curve represents the action of the circuit shown in FIG. 1 according to the invention. (Single-dot broken line curve represents the output characteristic of the circuit 2 with a double-dot broken line curve shows the output characteristic of the circuit 3.) It can be seen from synthesization of the curves 20 and 19 that the aimed correction of 100% can always be ensured.

In the foregoing, a first exemplary embodiment of the present invention has been described. In the following, description will be turned to some modifications and applications of the invention within the spirit and scope thereof.

In case the present invention is applied to a projection-type display apparatus, the auxiliary deflection coil 8 and the negative feedback amplifier 5 may serve also as a convergence coil and a convergence amplifier, respectively, for correcting chromatic aberrations.

When the invention is applied to conventional direct viewing CRT display, the auxiliary deflection coil 8 may be constituted by a coil wound on a yoke together with the main coil 7 separately therefrom.

Parenthetically, the $(x - x^3)$ computing circuit shown in FIG. 1 may be implemented by using two multipliers arranged to perform computation in accordance with "x" x "(1−x)" x "(1+x)". The multiplier to this end is commercially available, for example, from Motorola Company in U.S.A under the trade name of "1495L IC". By the way, some practical application of the display device requires that not only the horizontal scanning frequency but also the picture size be made variable. A structure of the $(x - x^3)$ computing circuit suited for this purpose will be described below.

Figure 5:
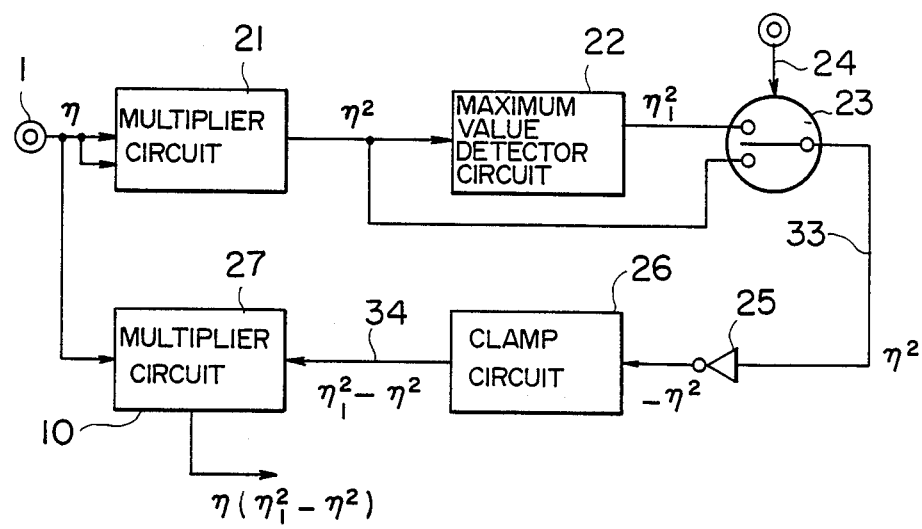
FIG. 5 is a circuit diagram showing another embodiment of the invention.

From the second term of the right side of the expression (5) and the expression (2), the correcting waveform as required is given by the following expression:

$$\frac{\tan^3 \theta_1 (x - x^3)}{2} = \frac{\tan \theta \, (\tan^2 \theta_1 - \tan^2 \theta)}{2} \quad (10)$$

where $\theta_1$ represents a deflection angle corresponding to a half screen width. FIG. 5 shows a circuit configuration of the $(x-x^3)$ computing circuit according to a second embodiment of the invention which is suited for generating the waveform in accordance with the above-mentioned expression with fidelity.

In FIG. 5, reference numerals 1 and 10 designate same signals as those shown in FIG. 1. Further, the signals making appearance in the circuit shown in FIG. 5 are expressed by using and $\eta_1$ in accordance with the definition that $\eta = \tan \theta$ and $\eta_1 = \tan \theta_1$ and waveforms of these signals are illustrated in FIG. 6 in which time is taken along the abscissa.

Figure 6:
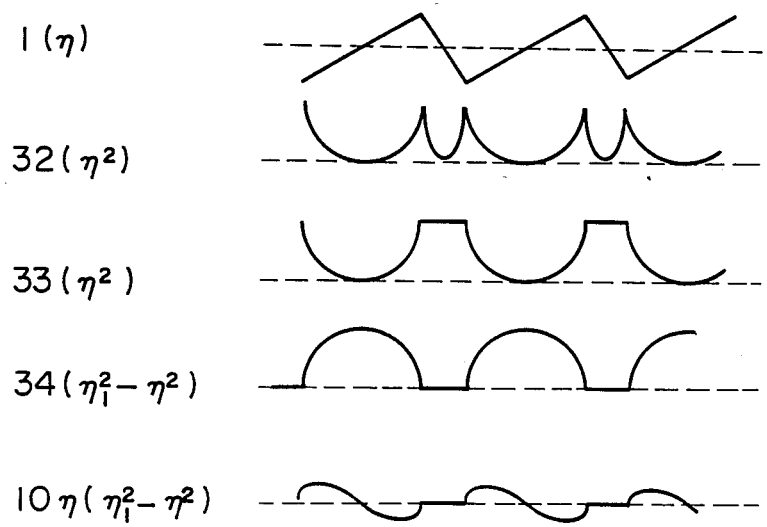
FIG. 6 is a waveform diagram showing waveforms generated at various points in the circuit shown in FIG. 5.

In FIG. 5, reference numeral 21 denotes a multiplier, the input waveform thereto and the output waveform therefrom being shown in FIG. 6 at 1 and 32, respectively. A numeral 22 denotes a maximum value detecting circuit which can be implemented by making use of the rectifier circuit technique known in the art. A numeral 23 denotes a change-over switch. A numeral 24 designates a horizontal flyback pulse signal or a horizontal blanking pulse signal, wherein the input $\eta_1^2$ is selected during the horizontal blanking period, while the input $\eta^2$ is selected during the horizontal scanning period. The output of the change-over switch 23 is shown in FIG. 6 at 33. Further, a numeral 25 denotes an inverter and 26 denotes a clamp circuit.

The clamp circuit 26 clamps the minimum output thereof to zero volt. The output waveform of this clamp circuit is shown in FIG. 6 at 34. At the flat portion of the waveform indicated by 34, $\eta$ is equal to $\eta_1$. Thus, $(\eta_1^2 - \eta^2)$ equal to zero and waveform 34 is clamped at zero volt. A reference numeral denotes a multiplier whose output waveform is illustrated in FIG. 6 at 10. It can thus be seen that the processing represented by the abovementioned expression (10) is performed by the circuit shown in FIG. 5. The change-over switch 23 serves for eliminating the useless waveforms varying at a high speed during the horizontal blanking period. This function is effective for evading the overload trouble ascribable to the restraint imposed on the through-rate of the negative feedback amplifier 5 shown in FIG. 1.

By applying the circuit shown in FIG. 5 to the $(x-x^3)$ computing circuit shown in FIG. 1, there can be realized a S-distortion correcting circuit which can automatically follow the change in the horiontal picture size.

I claim:

1. A S-distortion correcting circuit for a picture tube equipped with a main deflection coil and a horizontal deflection circuit for driving said main deflection coil, comprising:
   a first circuitry receiving a horizontal scanning signal from the horizontal scanning circuit for thereby generating on the basis of said horizontal scanning signal a correction signal for cancelling out horizontal S-distortion produced in dependence on a geometrical relation between the scanning locus of an electron beam and the plane of a screen of the picture tube;
   a second circuitry receiving the horizontal scanning signal of the horizontal deflection circuit to thereby generate on the basis of said horizontal scanning signal a correction signal for cancelling out horizontal S-distortion which is in inverse proportion to the second power of the horizontal scanning frequency and generated in the horizontal deflection circuit;
   means for adding together both the correction signals generated by said first circuitry and said second circuitry;
   an auxiliary deflection coil;
   current detecting means for detecting a current of said auxiliary deflection coil to thereby output a signal proportional to said current; and
   a negative feedback circuitry receiving as inputs thereto the output of said adder means and the output of said current detecting means for supplying to said auxiliary deflection coil such an output that the output of said current detecting means substantially coincides with the output of said adder means.

2. A S-distortion correcting circuit according to claim 1, wherein said first circuitry arithmetically determines a signal "x" proportional to the amplitude of said horizontal scanning signal and a signal representing the third power of said signal to thereby compute and output a signal representative of "$(x-x^3)$".

3. A S-distortion correcting circuit according to claim 2, wherein said first circuitry includes a first multiplier for computing "x" x "$(1-x)$" and a second multiplier for computing "output of said first multiplier" x "$(1-x)$".

4. A S-distortion correcting circuit according to claim 1, wherein said first circuitry includes a first multiplier for determining the second power "$\eta^2$" of a signal proportional t the amplitude of said horizontal scanning signal, a maximum value detecting circuit for detecting the maximum value "$\eta_1^2$" of the output of said first multiplier, a selector circuit receiving as the inputs thereto the outputs of said first multiplier and said maximum value detecting circuit for thereby selecting and outputting the output of said maximum value detecting circuit during a horizontal blanking period while selecting and outputting the output of said first multiplier during the horizontal scanning period, a clamp circuit receiving the "$(\eta_1^2-\eta^2)$", and a second multiplier receiving the output of said clamp circuit and the signal proportional to the amplitude of said horizontal scanning signal to thereby compute "$\eta_1^2-\theta^2$".

5. A S-distortion correcting circuit according to claim 1, wherein said first circuitry includes a circuit for arithmetically determining the third power of the value "x" proportional to the amplitude of said horizontal scanning signal to thereby output "$-x^3$".

6. A S-distortion correcting circuit according to claim 1, wherein said second circuitry includes a circuit for determining double integral of said horizontal scanning signal.

7. A S-distortion correcting circuit according to claim 6, wherein said second circuitry is constituted by two low-pass filters connected in cascade and each having a time constant sufficiently longer than the period of said horizontal scanning signal.

* * * * *